US008663000B2

(12) United States Patent
Olive

(10) Patent No.: US 8,663,000 B2
(45) Date of Patent: Mar. 4, 2014

(54) SLOT MACHINE GAME AND SYSTEM WITH IMPROVED JACKPOT FEATURE

(71) Applicant: Aristocrat Technologies Australia Pty Limited, North Ryde (AU)

(72) Inventor: Scott Olive, Balgowlah (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/925,628

(22) Filed: Jun. 24, 2013

(65) Prior Publication Data

US 2013/0288783 A1 Oct. 31, 2013

Related U.S. Application Data

(63) Continuation of application No. 13/238,379, filed on Sep. 21, 2011, which is a continuation of application No. 12/505,026, filed on Jul. 17, 2009, now abandoned, which is a continuation of application No. 11/365,177, filed on Mar. 1, 2006, now Pat. No. 7,625,283, which is a continuation of application No. 09/462,717, filed as application No. PCT/AU98/00525 on Jul. 8, 1998, now Pat. No. 7,056,215.

(30) Foreign Application Priority Data

Jul. 8, 1997 (AU) .................................... PO07780
Sep. 9, 1997 (AU) ...................................... PO9090

(51) Int. Cl.
*G06F 17/00* (2006.01)

(52) U.S. Cl.
USPC .................. 463/25; 463/18; 463/20; 463/27; 463/42

(58) Field of Classification Search
None
See application file for complete search history.

(56) References Cited

U.S. PATENT DOCUMENTS 3,819,186 A 6/1974 Hinterstocker
3,998,309 A 12/1976 Mandas et al.

(Continued)

FOREIGN PATENT DOCUMENTS

AU 524709 9/1982
AU 53370-86 8/1986

(Continued)

OTHER PUBLICATIONS

Aristocrat Catalog of Champions 1990, Aristocrat Leisure Industries, Rosebery NSW, 4 pages.

(Continued)

*Primary Examiner* — Paul A D'Agostino
(74) *Attorney, Agent, or Firm* — McAndrews, Held & Malloy, Ltd.

(57) ABSTRACT

Certain embodiments provide a method and system for awarding a progressive prize. The system includes a bank of gaming machines accepting different bets per play as selected by a player. A random number is selected from a predetermined fixed range of numbers that does not change during play of a gaming machine. The player is allotted one or more numbers for each credit bet. The allotted numbers represent a subset of the predetermined fixed range of numbers. A feature game is triggered for the progressive prize based on a numerical comparison between the selected random number and the number(s) allotted to the player. Certain embodiments provide a trigger condition for a feature outcome based on an event having a probability related to credits bet per game at a gaming machine. A probability of success in the feature game may be higher than a probability of success in the base game.

22 Claims, 3 Drawing Sheets

(56) References Cited

U.S. PATENT DOCUMENTS

| | | | |
|---|---|---|---|
| 4,238,127 | A | 12/1980 | Lucero et al. |
| 4,277,064 | A | 7/1981 | Newman |
| 4,448,419 | A | 5/1984 | Telnaes |
| 4,573,681 | A | 3/1986 | Okada |
| 4,582,324 | A | 4/1986 | Koza |
| 4,624,459 | A | 11/1986 | Kaufman |
| 4,652,998 | A | 3/1987 | Koza et al. |
| 4,743,024 | A | 5/1988 | Helm |
| 4,837,728 | A | 6/1989 | Barrie et al. |
| 4,842,278 | A | 6/1989 | Markowicz |
| 4,861,041 | A | 8/1989 | Jones et al. |
| 4,871,171 | A | 10/1989 | Rivero |
| 4,964,638 | A | 10/1990 | Ishida |
| 5,016,880 | A | 5/1991 | Berge |
| 5,048,833 | A | 9/1991 | Lamle |
| 5,074,559 | A | 12/1991 | Okada |
| 5,116,055 | A | 5/1992 | Tracy |
| 5,123,649 | A | 6/1992 | Tiberio |
| 5,158,293 | A | 10/1992 | Mullins |
| 5,209,479 | A | 5/1993 | Nagao et al. |
| 5,249,800 | A | 10/1993 | Hilgendorf et al. |
| 5,259,616 | A | 11/1993 | Bergmann |
| 5,276,312 | A | 1/1994 | McCarthy |
| 5,280,909 | A | 1/1994 | Tracy |
| 5,282,620 | A | 2/1994 | Keesee |
| 5,342,049 | A | 8/1994 | Wichinsky et al. |
| 5,344,144 | A | 9/1994 | Canon |
| 5,380,008 | A | 1/1995 | Mathis et al. |
| 5,393,057 | A | 2/1995 | Marnell, II |
| 5,401,024 | A | 3/1995 | Simunek |
| 5,423,539 | A | 6/1995 | Nagao |
| 5,511,784 | A | 4/1996 | Furry et al. |
| 5,524,888 | A | 6/1996 | Heidel |
| 5,531,440 | A | 7/1996 | Dabrowski et al. |
| 5,547,192 | A | 8/1996 | Ishibashi |
| 5,564,700 | A | 10/1996 | Celona |
| 5,570,885 | A | 11/1996 | Ornstein |
| 5,580,053 | A | 12/1996 | Crouch |
| 5,580,309 | A | 12/1996 | Piechowiak et al. |
| 5,588,649 | A | 12/1996 | Blumberg et al. |
| 5,588,650 | A | 12/1996 | Eman et al. |
| 5,601,487 | A | 2/1997 | Oshima |
| 5,609,524 | A | 3/1997 | Inoue |
| 5,611,535 | A | 3/1997 | Tiberio |
| 5,611,730 | A | 3/1997 | Weiss |
| 5,626,341 | A | 5/1997 | Jones et al. |
| 5,645,486 | A | 7/1997 | Nagao et al. |
| 5,646,486 | A | 7/1997 | Edwards et al. |
| 5,655,961 | A | 8/1997 | Acres et al. |
| 5,695,402 | A | 12/1997 | Stupak |
| 5,702,304 | A | 12/1997 | Acres |
| 5,707,285 | A | 1/1998 | Place et al. |
| 5,707,286 | A | 1/1998 | Carlson |
| 5,722,891 | A | 3/1998 | Inoue |
| 5,743,798 | A | 4/1998 | Adams et al. |
| 5,743,800 | A | 4/1998 | Huard |
| 5,762,552 | A | 6/1998 | Vuong et al. |
| 5,766,076 | A | 6/1998 | Pease et al. |
| 5,769,716 | A | 6/1998 | Saffari |
| 5,772,511 | A | 6/1998 | Smeltzer |
| RE35,864 | E | 7/1998 | Weingardt |
| 5,779,545 | A | 7/1998 | Berg et al. |
| 5,788,573 | A | 8/1998 | Baerlocher et al. |
| 5,807,172 | A | 9/1998 | Piechowiak |
| 5,820,459 | A | 10/1998 | Acres et al. |
| 5,833,538 | A | 11/1998 | Weiss |
| 5,833,540 | A | 11/1998 | Miodunski |
| 5,839,957 | A | 11/1998 | Schneider et al. |
| 5,851,148 | A | 12/1998 | Brune |
| 5,851,149 | A | 12/1998 | Xidos et al. |
| 5,855,514 | A | 1/1999 | Kamille |
| 5,855,515 | A | 1/1999 | Pease et al. |
| 5,857,909 | A | 1/1999 | Rubin |
| 5,876,284 | A | 3/1999 | Acres et al. |
| 5,885,158 | A | 3/1999 | Torango et al. |
| 5,910,048 | A | 6/1999 | Feinberg |
| 5,934,999 | A | 8/1999 | Valdez |
| 5,941,773 | A | 8/1999 | Harlick |
| 5,989,121 | A | 11/1999 | Sakamoto |
| 6,007,427 | A | 12/1999 | Wiener |
| 6,012,982 | A | 1/2000 | Piechowiak et al. |
| 6,019,374 | A | 2/2000 | Breeding |
| 6,039,649 | A | 3/2000 | Schulze |
| 6,050,895 | A | 4/2000 | Luciano, Jr. et al. |
| 6,059,659 | A | 5/2000 | Busch et al. |
| 6,068,553 | A | 5/2000 | Parker |
| 6,089,977 | A | 7/2000 | Bennett |
| 6,089,980 | A | 7/2000 | Gauselmann |
| 6,093,102 | A | 7/2000 | Bennett |
| 6,117,013 | A | 9/2000 | Eiba |
| 6,126,542 | A | 10/2000 | Fier |
| 6,135,884 | A | 10/2000 | Hedrick et al. |
| 6,146,270 | A | 11/2000 | Huard et al. |
| 6,146,273 | A | 11/2000 | Olsen |
| 6,168,521 | B1 | 1/2001 | Luciano et al. |
| 6,179,711 | B1 | 1/2001 | Yoseloff |
| 6,241,608 | B1 | 6/2001 | Torango |
| 6,319,125 | B1 | 11/2001 | Acres |
| 6,358,150 | B1 | 3/2002 | Mir et al. |
| 6,364,768 | B1 | 4/2002 | Acres et al. |
| 6,375,567 | B1 | 4/2002 | Acres |
| 6,416,409 | B1 | 7/2002 | Jordan |
| 6,435,968 | B1 | 8/2002 | Torango |
| 6,450,887 | B1 | 9/2002 | Mir et al. |
| 6,533,664 | B1 | 3/2003 | Crumby |
| 6,572,471 | B1 | 6/2003 | Bennett |
| 6,575,834 | B1 | 6/2003 | Lindo |
| 6,592,460 | B2 | 7/2003 | Torango |
| 6,634,946 | B1 | 10/2003 | Bridgeman et al. |
| 6,811,486 | B1 | 11/2004 | Luciano, Jr. |
| 6,916,245 | B1 | 7/2005 | Vancura et al. |
| RE38,982 | E | 2/2006 | Forte et al. |
| 7,048,628 | B2 | 5/2006 | Schneider |
| 7,056,215 | B1 | 6/2006 | Olive |
| 7,070,505 | B2 | 7/2006 | Vancura et al. |
| 7,108,603 | B2 | 9/2006 | Olive |
| 7,384,336 | B2 | 6/2008 | Torango |
| 2001/0007828 | A1 | 7/2001 | Walker et al. |
| 2001/0009865 | A1 | 7/2001 | Demar et al. |
| 2001/0049303 | A1 | 12/2001 | Found et al. |
| 2003/0100361 | A1 | 5/2003 | Sharpless et al. |
| 2004/0235554 | A1 | 11/2004 | DeFrees-Parrott et al. |
| 2005/0143168 | A1 | 6/2005 | Torango |
| 2005/0192086 | A1 | 9/2005 | Walker et al. |
| 2005/0282609 | A1 | 12/2005 | Olive |
| 2006/0154718 | A1 | 7/2006 | Willyard et al. |

FOREIGN PATENT DOCUMENTS

| | | | |
|---|---|---|---|
| AU | 589158 | | 10/1989 |
| AU | 33868-89 | | 11/1989 |
| AU | 42326/89 | | 3/1990 |
| AU | 630112 | | 10/1992 |
| AU | 20986/92 | | 1/1993 |
| AU | 633469 | | 1/1993 |
| AU | 70247/96 | | 4/1997 |
| AU | 707687 | | 4/1997 |
| AU | 12968/97 | A1 | 7/1997 |
| AU | 680602 | | 7/1997 |
| AU | 18618/97 | | 9/1997 |
| AU | 711501 | | 9/1997 |
| AU | 24938/97 | | 1/1998 |
| AU | 686824 | | 2/1998 |
| AU | 199743615 | A1 | 5/1998 |
| AU | 64844/98 | | 11/1998 |
| AU | 655801 | | 12/1998 |
| AU | 199878853 | | 2/1999 |
| AU | 199884162 | | 3/1999 |
| AU | PO9102 | | 3/1999 |
| AU | 199924976 | | 11/1999 |
| AU | 716299 | | 2/2000 |
| AU | 721968 | | 7/2000 |
| AU | 722107 | | 7/2000 |

(56) References Cited

FOREIGN PATENT DOCUMENTS

| | | |
|---|---|---|
| AU | 758308 | 5/2001 |
| AU | 736679 | 8/2001 |
| AU | 746506 | 5/2002 |
| AU | 748263 | 5/2002 |
| AU | 757903 | 3/2003 |
| AU | 765084 | 9/2003 |
| DE | 3415114 | 10/1985 |
| DE | 3917683 | 12/1990 |
| DE | 4200254 | 8/1993 |
| EP | 0420586 | 3/1991 |
| GB | 2153572 | 8/1985 |
| GB | 2231189 | 11/1990 |
| GB | 2282690 | 12/1995 |
| WO | 95/22811 | 8/1995 |
| WO | 96/24421 | 8/1996 |
| WO | 97/27568 | 7/1997 |
| WO | 99/10849 | 8/1997 |
| WO | 97/32285 | 9/1997 |
| WO | 98/31443 | 7/1998 |
| WO | 98/47115 | 11/1998 |
| WO | 99/03078 | 1/1999 |

OTHER PUBLICATIONS

Article 'Clubs now have a sporting chance' and insert 'An investment in Aristocrat is an investment in your future' in Slotworld Magazine, vol. 5, No. 6, Jun. 1992, 7 pages.
Mikohn product catalog, Jan. 1993, 64 pages.
Queensland Office of Gaming Authority, Gaming Machine Minimum Requirements Version 6.03e, 1996, 94 pages.
Casino Journal, vol. 9, No. 10, Oct. 1996, 19 pages.
Action Jackpots pamplet, Atronic Casino Technology, Phoenix, AZ, 1996, 4 pages.
U.S. Appl. No. 60/035,513 by Torango and Lannoy, filed Jan. 15, 1997 and referenced by U.S. Patent Nos. 6,435,968, 6,241,608 and 6,592,460.
U.S. Appl. No. 60/040,982 by Torango and Lannoy, filed Mar. 17, 1997 and referenced by U.S. Patent Nos. 6,435,968, 6,241,608 and 6,592,460.
U.S. Appl. No. 60/050,971 by Torango and Lannoy, filed Jun. 19, 1997 and referenced by U.S. Patent Nos. 6,435,968, 6,241,608 and 6,592,460.
Aristocrat Buyers Guide Mar.-May 1989, 2 pages.
Victorian Casino and Gaming Authority, "Technical Requirements for Gaming Machines and Electronic Monitoring Systems in the Melbourne Casino" dated Jul. 10, 1996.
Mikohn press release relating to 'Moneytime Slot Jackpot Spectacular', Jul. 16, 1997, 2 pages.
QCOM Local Area Electronic Gaming Machine Communications Protocol, Version 1.2 ("QCOM"), Apr. 23, 1997, 64 pages.
Statement of Grounds and Particulars in Support of Oppostion corresponding to Australian Patent Application No. 754689, May 21, 2003.
Statutory Declaration of John Soris Golja, Australia, May 21, 2004.
Statutory Declaration of Phillip Charles Dimond, Mar. 2, 2005.
Statutory Declaration of Scott Olive, Australia, May 9, 2005.
Plaintiff Torango's Supplemental Response to Defendant Aristocrat Technologies, Inc.'s First Set of Interrogatories, U.S. District Court for the District of Nevada, No. CV-N-03-0690-HDM-RAM, Aug. 19, 2004.
Defendant Aristocrat Technologies Australia Pty Limited's Supplemental Interrogatory Response, in Torango v. Aristocrat, U.S. District Court for the District of Nevada, No. CV-N-03-0690, Dec. 14, 2004.
Order, Court's Ruling on Claim Construction in Cynthia Jean Goff v. Harrah's Operating Company, Inc., et al., U.S. District Court for the District of Nevada, No. CV-N-03-0690, Dec. 30, 2005.
Court Docket Sheet for Aristocrat Technologies Australia Pty Ltd. v. International Game Technology, U.S. District Court for the Northern District of California—San Francisco Division, Case No. CV-06-03717-MJJ, Aug. 19, 2004.
Complaint—Demand for Jury Trial, Case No. C 06 3717, Aristocrat Technologies Australia PTY Limited and Aristocrat Technologies, Inc. v. International Game Technology and IGT, Jun. 12, 2006, 15 pages.
IGT Answer and Counterclaim in Case No. 03:C-06-3717-MJJ, Jul. 28, 2006.
First Amended Complaint—Demand for Jury Trial, Case No. C 06 3717, Aristocrat Technologies Australia PTY Limited and Aristocrat Technologies, Inc. v. International Game Technology and IGT, Dec. 15, 2006, 29 pages.
IGT Amended Answer and Counterclaim in Case No. 03:C-06-03717-MJJ, Jan. 2, 2007.
Defendants International Game Technology and IGT's Notice of Motion and Motion for Partial Summary Judgment that the '215 and '603 Patents are Invalid Under § 112, ¶2, Aristocrat Technologies Australia PTY Limited and Aristocrat Technologies, Inc. v. International Game Technology and IGT, No. 06-cv-03717, Apr. 3, 2007.
Plaintiffs Aristocrat Technologies Australia PTY Limited and Aristocrat Technologies, Inc.'s Opposition to Defendants International Game Technology and IGT's Motion for Partial Summary Judgment that the '215 and '603 Patents are Invalid Under § 112, ¶ 2, Aristocrat Technologies Australia PTY Limited and Aristocrat Technologies, Inc. v. International Game Technology and IGT, No. 06-cv-03717, Apr. 17, 2007.
Joint Statement of Undisputed Facts for Defendants' Motion for Partial Summary Judgment that the '215 and '603 Patents are Invalid Under § 112, ¶ 2, Aristocrat Technologies Australia PTY Limited and Aristocrat Technologies, Inc. v. International Game Technology and IGT, No. 06-cv-03717, Apr. 24, 2007.
Defendants International Game Technology and IGT's Reply in Support of Partial Summary Judgment that the '215 and '603 Patents are Invalid Under § 112, ¶2, Aristocrat Technologies Australia PTY Limited and Aristocrat Technologies, Inc. v. International Game Technology and IGT, No. 06-cv-03717, Apr. 24, 2007.
Appellate Decision, Case No. C 06 3717, Aristocrat Technologies Australia PTY Limited and Aristocrat Technologies, Inc. v. International Game Technology and IGT, Sep. 22, 2008, 14 pages.
Order Granting Defendants' Motion for Summary Judgment of Noninfringement based on Muniauction, No. 06-cv-03717, May 13, 2010.
Appellate Decision, United States Court of Appeals for the Federal Circuit, Aristocrat Technologies Australia Pty Limited and Aristocrat Technologies, Inc. v. International Game Technology and IGT, No. 2010-1426, Appeal from the United States District Court for the Northern District of California in No. 06-CV-3717, 30 pages, Mar. 13, 2013.
Information sheet on Mystery Jackpot by Mikohn Progressive Systems, Mikohn Gaming Corporation, Las Vegas, NV, 4 pages, Dec. 13, 2008.
Particulars of invalidity, Federal Court of Australia, District Registry: New South Wales, Division: General, No. NSD 1429/2011, Nov. 17, 2011.
Documents related to the Surprize game.
Documents related to the Surprize (MV2030) game.
Suprize Gaming Machine Advertisement, Aristocrat Leisure Industries, Australia.
"Surprize Software. Specification for MV2030 var 01", Aristocrat Leisure Industries, Australia.
Documents related to the Fast Buck game.
Documents related to Down-loaded System Awards Regulations.
Documents related to the ACES game.
Documents related to the Best-and-Fairest game.
Documents related to the Cricketer game.
Documents related to the Thrillions game.
Queensland Treasury Office of Gaming Regulation, 1996, 64 pages.
International Search Report corresponding to International Application No. PCT/AU98/00525, Aug. 11, 1998.

| | | | | |
|---|---|---|---|---|
| 20 | 11 | 11 | 3 | 7 |
| 12 | 10 | 18 | 13 | 22 |
| 9 | 12 | 13 | 24 | 9 |

Figure 3

SLOT MACHINE GAME AND SYSTEM WITH IMPROVED JACKPOT FEATURE

RELATED APPLICATIONS

This application is a continuation of U.S. patent application Ser. No. 13/238,379, filed Sep. 21, 2011, which is a continuation of U.S. patent application Ser. No. 12/505,026, filed Jul. 17, 2009, which is a continuation of U.S. patent application Ser. No. 11/365,177 filed on Mar. 1, 2006, now U.S. Pat. No. 7,625,283, which is a continuation of Ser. No. 09/462,717 filed on Apr. 10, 2000, now U.S. Pat. No. 7,056, 215, which is a 371 national phase filing of International Patent Application No. PCT/AU98/00525 filed Jul. 8, 1998. International Patent Application No. PCT/AU98/00525 claims priority to Australian Patent Application No. PO 7780 filed Jul. 8, 1997 and Australian Patent Application No. PO 9090 filed Sep. 9, 1997. Each of the above-referenced applications are hereby incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to apparatus for use with a system of linked poker machines and in particular the apparatus provides an improved jackpot mechanism for use with such a poker machine system.

Many schemes have been devised in the past to induce players to play slot machines including schemes such, as specifying periods during which jackpot prizes are increased or bonus jackpots paid. Other schemes involve awarding an additional prize to a first player to achieve a predetermined combination on a poker machine. These methods, while effective, add to club overheads because of the need for additional staff to ensure that the scheme is operated smoothly.

More recently, with the advent of poker machines linked through electrical networks it has been possible to automatically generate jackpot prizes on the basis of information received from the machines being played which are connected to the system and one such prior art arrangement, commonly known as "Cashcade™", counts turnover on all machines in the network, increments a prize value in accordance with the turnover and pays the jackpot prize when the count reaches some predetermined and randomly selected number. In a more recent prior art arrangement, each game played on each machine in a gaming system is allocated a randomly selected number and the prize is awarded to a machine when the game number it is allocated matches a preselected random number.

In another recent prior art arrangement, the winning machine is selected by randomly selecting a number at a point in time and decrementing the number as games played on the system are counted until the number is decremented to zero at which time the game (or associated machine) causing the final decrement is awarded the jackpot.

With some prior art combination based trigger arrangements there is a serious disadvantage in that the player betting a single token per line, is just as likely to achieve a jackpot as the player playing multiple tokens per line. This has the effect of encouraging players playing for the bonus jackpot to bet in single tokens, rather than betting multiple tokens per game.

Jackpot games have traditionally been popular in Casinos. However, in their conventional format these games have inherent limitations:

(i) Games which use specific combinations of symbols to trigger jackpots are perceived by many players as being unwinnable. The games are typically designed in such a way that the big jackpots should not be won until large amounts are accumulated. With such low frequency the jackpots are never seen to be won by most players. Anecdotal evidence suggests that many players have learnt to disregard the chance of winning the major jackpots and are realistically playing for the lesser jackpots (i.e. the minor and mini jackpots). The increasing popularity of small mystery jackpots with higher frequencies of occurrence tends to support this argument;

(ii) Due to the increasing demand of players for a more complex and diverse game range, conventional jackpot games with combination triggers have become superseded. However, it is extremely complex to develop a wide variety of combinations which support both a feature game and mathematically exact jackpot triggers;

(iii) Typically, it would be expected that the game return (RTP) is independent of the number of coins bet per line. With conventional progressive jackpot games though, increasing the credits bet per line creates a relative disadvantage as far as RTP is concerned. Let's say the start-up amount for a feature jackpot is $10000. A player who is playing 1 credit per line has a chance for $10000 for each credit played, whereas a player playing 5 credits per line only has a chance for $2000 for each credit played. This creates a scale of diminishing returns. The smart player who gambles for the feature jackpot only, will always cover all playlines, but will only bet 1 credit per line because the prize paid for the feature jackpot is the same irrespective of the bet. This is supported by data collected from casinos;

(iv) Typical combination triggered progressive jackpots have fixed hit rates which removes from the operator's control the ability to vary jackpot frequency.

These arrangements have been in use in the State of New South Wales and in other jurisdictions for a considerable period of time, however, as with other aspects of slot machine games, players become bored with such arrangements and new and more innovative schemes become necessary in order to stimulate player interest.

In this specification, the term "combinations" will be used to refer to the mathematical definition of a particular game. That is to say, the combinations of a game are the probabilities of each possible outcome for that game.

BRIEF SUMMARY OF THE INVENTION

According to a first aspect the present invention provides a random prize awarding system associated with a gaming console, the console being arranged to a offer a feature outcome when a game has achieved a trigger condition, the console including trigger means arranged to test for a trigger condition and to initiate the feature outcome when the trigger condition occurs, the trigger condition being determined by a event having a probability related to credits bet per game on the console.

According to a second aspect, the present invention provides a random prize awarding system associated with a network of gaming consoles, the system being arranged to offer a feature outcome on a particular console when a trigger condition occurs as a result of a game being played on the respective console the prize awarding system including trigger means arranged to test for a trigger condition and to initiate the feature outcome on the respective console when the trigger condition occurs, the trigger condition being determined by an event having a probability related to credits bet per game on the respective console.

According to a third aspect, the present invention provides a gaming console including a random prize awarding feature, the gaming console being arranged to offer a feature outcome when a game has achieved a trigger condition, the console including trigger means arranged to test for the trigger condition and to initiate the feature outcome when the trigger condition occurs, the trigger condition being determined by an event having a probability related to credits bet per game on the console.

According to a fourth aspect, the present invention provides a method of awarding a random prize associated with a gaming console arranged to offer a feature outcome when a game abs achieved a trigger condition, the method including testing for a trigger condition and initiating the feature outcome when the trigger condition occurs, the trigger condition being determined by an event having a probability related to credits bet per game on the respective console.

Preferably the trigger condition is determined by an event having a probability related both to expected turnover between consecutive occurrences of the trigger condition, on the respective console and the credits bet on the respective game.

In a preferred embodiment of the invention, the trigger condition is determined by selecting a random number from a predetermined range of numbers to be associated with each bought game, and for each credit bet on the respective game, allotting to the game, one or more numbers from the predetermined range of numbers, and in the event that one of the numbers allotted to the player matches the randomly selected number, indicating that the trigger condition has occurred.

In one embodiment, one or more gaming consoles are connected in a gaming network, each of the consoles including signal output means arranged to produce an output signal in response to operation of the respective console, such that a central feature jackpot system connected to the network provides an incrementing jackpot which is increased in response to signals from the consoles connected to the network.

Preferably also, the console is arranged to play a fast main game and the feature outcome initiated by the trigger condition is a second feature game.

The function of triggering a feature jackpot game may either be performed by a central feature game controller or may be performed within each console in the system.

In the preferred embodiment, the predetermined range of numbers is determined as a function of expected turnover between consecutive occurrences of the trigger condition, expected jackpot amounts and jackpot frequencies and will equal the expected average turnover per machine between successive initiations of progressive jackpot games divided by the credit value for that machine. For example, if the progressive jackpot is to be played for an average every $5,000 of turnover played and the credit value on the machine is $0.05, then the number range will be 1 to 100.000 (i.e. 5,000/0.05). In the preferred embodiment, the gaming machine will allocate the lowest numbers in the range to the player such that if the player plays 20 credits he will be allocated numbers 1-20 giving him a 1 in 5.000 chance of triggering a jackpot feature game.

Alternatively, the number range can be set to the average expected turnover between jackpot occurrences expressed in cents (500,000 in the above example), in which case the numbers allocated to the player, will be proportional to his total wager expressed in cents (i.e. 1-100 in the above example).

Preferably, the feature game is a simplified game having a higher probability of success than the first game. In a particularly preferred embodiment, the second game is a spinning reel game having a reduced number of symbols on each reel and a jackpot is activated if after spinning the reels a predetermined, combination of symbols appears on the win line of each reel.

In one particular example, the second screen game is a five reel game with two different symbols on each reel. The symbols may be of equal value and equally weighted (i.e. same number of instances) on each reel or alternatively, the prizes might be of different values (e.g. different fractions of the pool) and the symbols have different weightings on at least one reel.

Preferably, the prize awarded in a jackpot game by the system of the present invention, is a monetary amount the value of which is incremented with each game played on each gaming machine or console in the system. Alternatively, the incrementation can take place on a per token bet basis.

Where used above, the term 'console' is used to indicate a gaming machine, a gaming terminal or other device arranged to be connected to a communications system and to provide a user gaming interface. In the following description, examples are given which are applicable to traditional slot machines, however the invention should be taken to include gaming systems which include user interfaces other than traditional slot machines.

BRIEF DESCRIPTION OF SEVERAL VIEWS OF THE DRAWINGS

Embodiments of the invention will now be described by way of example, with reference to the accompanying drawings, in which:

FIG. 3 shows an example of a 5 reel by 3 row window display.

DETAILED DESCRIPTION OF THE INVENTION

In a preferred embodiment of the invention, a new jackpot trigger mechanism provides the Casino operator with a far higher degree of flexibility. Unlike conventional combination triggered jackpots, the jackpots here are won from a feature game. The feature game is triggered randomly as a function of credits bet per game. When a feature is triggered, a feature game appears. Each jackpot can only be won from this feature game. During the feature game a second set of reel strips appears and a "spin and hold" feature game commences. The feature prize score is calculated by the total of the points appearing on the centre line of all 5 reels.

Feature jackpots in this format exhibit significant differences over previous jackpot systems:

(i) A jackpot game is provided which is compatible with any existing game combination within an installation independent of the platform, denomination or type of game (e.g. slot machines, cards, keno, bingo or pachinko). This will allow for the linking of combinations between game type, platform type and denomination. Using this system, jackpot games can now be developed using specific combinations for the base game which were previously unsuitable for Link Progressive Systems. These games will compete with the appeal of the latest games on the market.

(ii) There is no longer a need to develop mathematically exact combinations in the base game.

(iii) Unlike the multiplier game in combination triggered jackpot embodiments, the present invention provides a direct relationship between the number of credits bet and the probability of winning the jackpot feature game on any one bought game. Betting 10 credits per line will produce ten times as many, hits into the feature game than betting 1 credit per line. This is achieved by using a jackpot trigger which is directly related to the wager bet on a respective game and the turnover, instead of using conventional combination triggers.

(iv) Jackpot hit rates can now be changed without making changes to the base game. This was previously not possible using combination triggered jackpots.

(v) The jackpot feature system can be used across, a wide-area-network (WAN), local-area-network (LAN), used as a stand-alone game independent of a network or used with a mystery jackpot Flexibility is available to change combinations at will.

Figure 1:
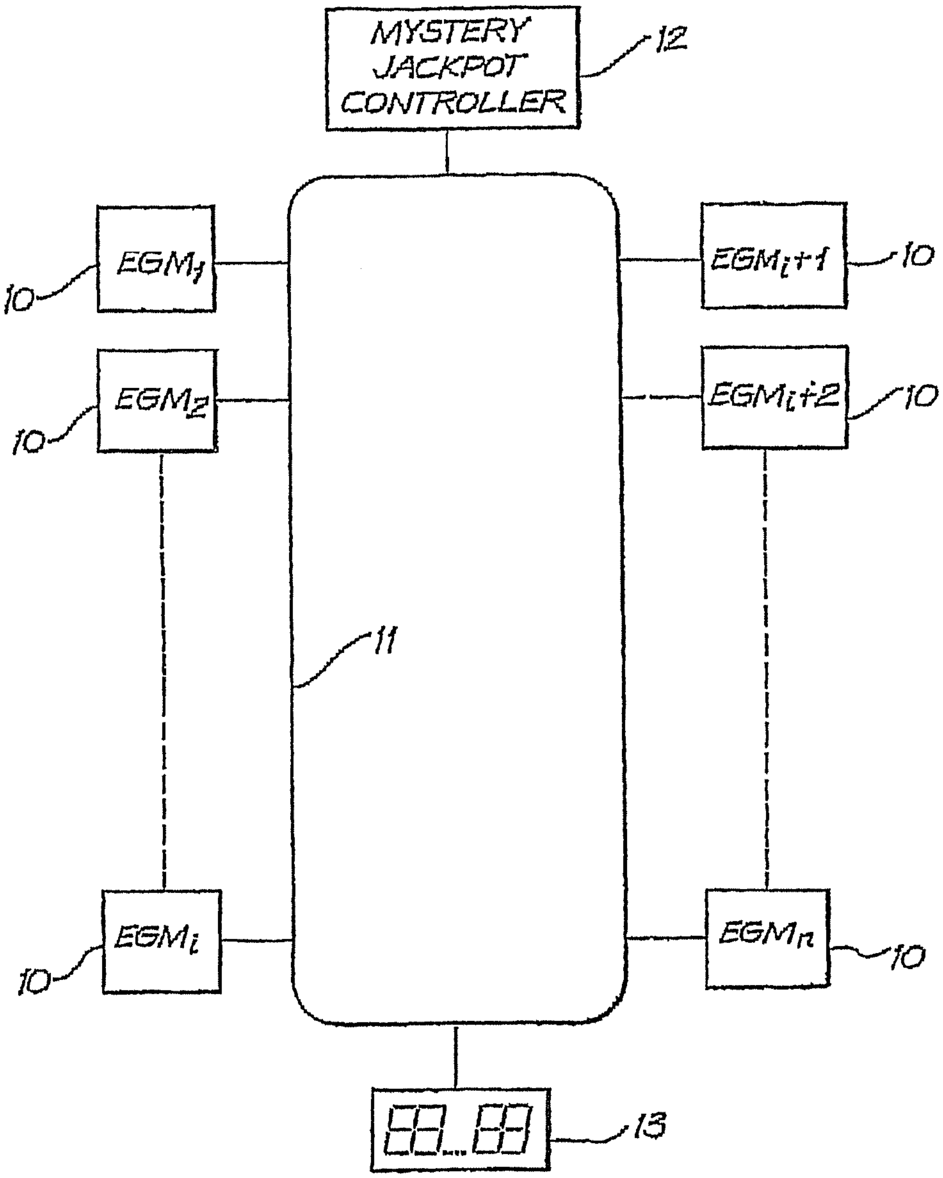
FIG. 1 is a block diagram of a network of electronic gaming machines to which a mystery jackpot controller according to the present invention is connected.

Referring to FIG. 1 a plurality of electronic gaming consoles 10 are connected to a network 11, to which a feature jackpot controller 12 and display means 13 are also connected.

Each of the electronic gaming consoles 10 are provided with a network interface arranged to provide a signal onto the network 11 on each occurrence of an operation of a respective console and the jackpot controller 12 is arranged to receive each of the console operation signals and to increment the value of a random jackpot prize on the occurrence of each of these operation signals.

Figure 2:
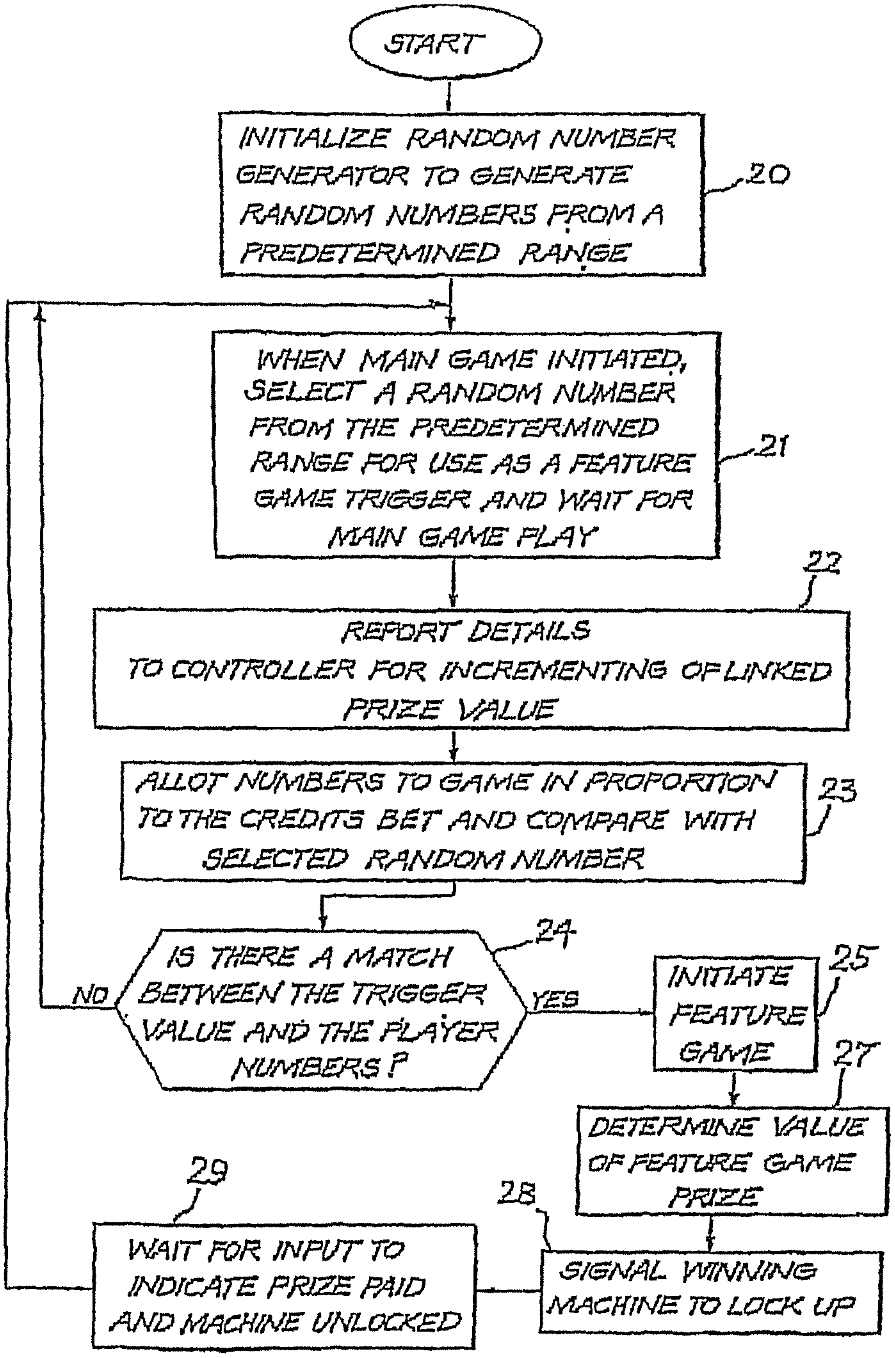
FIG. 2 is a flow chart showing a game arrangement according to the invention.

A flow chart for a prize awarding algorithm is illustrated in FIG. 2.

Referring to the algorithm of FIG. 2, machine contributions go into the prize pool as with known prior art jackpot systems, while the overhead display shows the incrementing prize value.

In the EMG, an average value of machine turnover between jackpot hits, is programmed and is used to randomly generate trigger data for the jackpot feature games. In step 20 of the algorithm of FIG. 2, the actual number range and therefore probability of a feature jackpot game being awarded will depend upon the value of a credit in the particular machine and is calculated by dividing the turnover value by the value of a credit (e.g., \$5000/\$0.05=100,000). The average turnover value is fixed for the EGMs and the random number generator is initialised (see step 20) at startup to generate numbers from the preprogrammed range determined from that value.

For every game that is played, a random trigger value is selected (see step 21) in the preprogrammed range as determined from the average turnover value. When the game is commenced, it is then reported (see step 22) to the controller, which allocates a contribution to the prize pool. Each game is also allotted (see step 23) numbers from the same number range that from which the random number was selected, one number in the range being allotted for each credit bet such that the player's probability of being awarded a jackpot feature game is proportional to the bet.

The previously selected random number is then used as a trigger value and compared with the values allotted to the player, if there is a match (see step 24) between the trigger value and the player values, the player is given an opportunity to play a jackpot feature game (see step 25). Alternatively, at step 23, a number is allocated which is equal to, or proportional to the number of credits bet in the respective game and in step 24, the trigger value is compared with the single player value and a jackpot feature awarded if the trigger value is less than or equal, to the player value. It will be appreciated that this alternative arrangement is mathematically equivalent to the previously described arrangement, the range of numbers below the allotted number in the alternative arrangement being equivalent to the set of allotted numbers in the previously described arrangement.

In the preferred embodiment, a prize is always awarded in the jackpot feature game, the feature game being used to determine the size of the prize to be awarded (see step 27). The winning machine is then locked up (see step 28) and the controller awaits an indication that the prize has been paid before allowing the machine to be unlocked (see step 29). In some embodiments, the machine will not be locked up in steps 28 and 19, but instead the prize will simply be paid and the program will return to step 21. The machine then returns to step (see step 21) and, commences a new game. If the trigger value does not match (see step 27) then there is no feature game awarded for that bought game and the machine returns to step (see step 22) and waits for the next game to commence.

By way of example, a feature game might be triggered by an EGM every \$5000 of turnover played, which is equivalent to 100,000 credits on a \$0.05 machine. This is referred to as the jackpot feature game hit rate in credits. A random number is generated within a prescribed range of numbers at the EGM at the commencement of each bought game. The prescribed range of numbers is determined by the jackpot feature game hit rate which has been determined previously, from typical values of casino turnover, expected jackpot amounts and jackpot frequencies. The prescribed range in this example is therefore 1 to 100,000 and before the commencement of each bought game a random number is generated within this range.

A bet of 20 credits will result in the numbers between 1 and 20 (inclusive) being allotted to the game (note that statistically it does not matter if the numbers are randomly selected or not or allotted as a block or scattered, the probability of a feature game being awarded is unchanged). If the number 7 is produced by the random number generator, then the feature game will be triggered. If any number between 21 and 100,000 is produced by the random number generator, the feature game will not be triggered. Similarly, a bet of 200 credits will result in the numbers between 1 and 200 (inclusive) being allotted to the game. If any number between 1 and 200 is produced by the random number generator, then the feature game will be triggered. If any number between 201 and 100,000 is produced by the random number generator, the feature game will not be triggered.

The example below has been developed using example turnover data. A trigger of the second screen feature game is expected every \$5000 of turnover (i.e. 100000 credits on a \$0.05 machine). Increasing the number of credits bet increases the chance of triggering the feature on any bought game.

| Number of credits bet | Range numbers assigned | Games to hit | Bet/game | Turnover of EGM since last hit (\$) |
|---|---|---|---|---|
| 1 | 1 to 1 | 100000 | \$0.05 | \$5000 |
| 2 | 1 to 2 | 50000 | \$0.10 | \$5000 |
| 3' | 1 to 3 | 33333.33 | \$0.15 | \$5000 |
| 5 | 1 to 5 | 20000 | \$0.25 | \$5000 |
| 10 | 1 to 10 | 10000 | \$0.50 | \$5000 |
| 15 | 1 to 15 | 6666.66 | \$0.75 | \$5000 |

-continued

| Number of credits bet | Range numbers assigned | Games to hit | Bet/game | Turnover of EGM since last hit ($) |
|---|---|---|---|---|
| 20 | 1 to 20 | .5000 | $ 1.00 | $5000 |
| 25: | 1 to 25 | 4000 | $ 1.25 | $5000 |
| 30 | 1 to 30 | 3333.33 | $ 1.50 | $5000 |
| 40 | 1 to 40 | 2500 | $ 2.00 | $5000 |
| 45 | 1 to 45 | 2222.22 | $ 2.25 | $5000 |
| 50 | 1 to 50 | 2000 | $ 2.50 | $5000 |
| 60 | 1 to 60 | 1666.66 | $ 3.00 | $5000 |
| 75 | 1 to 75 | 1333.33 | $ 3.75 | $5000 |
| 100 | 1 to 100 | 1000 | $ 5.00 | $5000 |
| 150 | 1 to 150 | 666.66 | $ 7.50 | $5000 |
| 200 | 1 to 200 | 500 | $10.00 | $5000 |

Preferably, when a jackpot feature game is triggered, all players are alerted by a jackpot bell that a possible grand jackpot is about to be played for. This is done so that all players share in the experience of a jackpot win. Anecdotal evidence of players watching feature games being played in Australian casinos suggests that the drawing power of such games is immense.

Players are alerted by the jackpot bell instantaneously at any point during a game, but the feature game will not appear until the current game (including base game features) are completed.

In this embodiment the feature game appears with the new reel strips already spinning and accompanying feature game tunes playing. The player stops the reels spinning by pressing the corresponding playline buttons in order. The feature prize score is calculated by the total of the points appearing on the centre line of all 5 reels. Across the top of the screen, a sum of the score is displayed.

The 4 feature prize meters in descending order of value are:

(i) Grand Feature Prize. A score of ≥100 wins the grand feature jackpot;

(ii) Major Feature Prize. A score of 90-99 (inclusive) wins the major feature jackpot;

(iii) Minor Feature Prize. A score of 80-89 (inclusive) wins the minor feature jackpot;

(iv) Mini Feature Prize, A score of ≤79 wins the mini feature jackpot.

By way of example, referring to FIG. 3, a 5 reel by 3 row window is displayed. If the reels of the feature game stop on the numbers shown in FIG. 3, then the progressive jackpot won is the sum of the numbers on the center line i.e., 12+10+18+13+22=75 which is within the range for the mini feature jackpot.

The instant the feature game is completed and the sum of scores from all 5 reels is shown, the feature jackpot screen and signs display which jackpot has been won. This celebration of the jackpot win is conducted in a traditional manner (i.e. flashing displays, jackpot alarms, music etc.)

As the time between jackpot game awards is related to turnover, the number of jackpot games played by a player between feature games and hence their chance of winning is directly related to the size of each bet on each game played.

(1) All machines on the link have a feature game, be it a second screen animation game or a second set of reel strips.

(2) The link has a number of feature jackpot meters (up to 8). All feature jackpots may be linked.

(3) The feature game is activated as a function of machine turnover. This means that on average the feature game will occur one in, for example every $5000.00. There are a number of advantages of activating the feature game on turnover. For example, it enables for the first time, a relatively simple mechanism for allowing mixed denomination on a link. The feature game gives the player the chance of winning one of the available feature jackpots if a certain outcome appears. For example, a new set of reel strips might appear with only 2 or 4 different symbols: Jackpot 1, Jackpot 2, or (Jackpot 1, Jackpot 2, Jackpot 3, Jackpot 4). The first time 5 of the same appear on the centre line the stated feature jackpot is won.

(4) Another advantage of using a random trigger for a feature game, is that it can be applied to any game.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming machine arranged to facilitate a play of a first game in which a player can wager an amount of credits on an outcome of the first game, the gaming machine also being arranged to detect an occurrence of a trigger event during the play of the first game, the gaming machine being further arranged to facilitate a play of a second game in response to detecting the occurrence of the trigger event, the gaming machine being arranged to determine an outcome of the second game and to identify one of a plurality of separate jackpot prizes to be awarded to the player based on the outcome of the second game, wherein the occurrence of the trigger event is based on a predefined turnover value and the amount of credits wagered on the first game, and the predefined turnover value is an expected turnover of the gaming machine between a first occurrence of the trigger event during play of the first game and a subsequent consecutive second occurrence of the trigger event during play of a subsequent first game.

2. The gaming machine as claimed in claim 1, wherein the play of the second game can only occur after the play of the first game has been completed.

3. The gaming machine as claimed in claim 1, wherein the plurality of separate jackpot prizes are maintained by a jackpot controller and the gaming machine is arranged to communicate with the jackpot controller via a communication network.

4. The gaming machine as claimed in claim 3, wherein the gaming machine is one of a plurality of gaming machines in which at least a first of the gaming machines has a denomination that is different to a denomination of at least a second of the gaming machines.

5. The gaming machine as claimed in claim 1, wherein the occurrence of the trigger event is based on: selecting a number from a predetermined range of numbers, the predetermined range of numbers being based on the predefined turnover value; and selecting a set of numbers from the predetermined range of numbers, wherein the size of the selected set of numbers is based on the amount of credits wagered on the first game, wherein if the number selected from the predetermined range of numbers and the selected set of numbers meet a predefined criterion the game controller detects the occurrence of the trigger event.

6. A method for use with a gaming machine, the method comprising the steps of:

facilitating a play of a first game in which a player can wager an amount of credits on an outcome of the first game;

detecting an occurrence of a trigger event during the play of the first game;

facilitating a play of a second game in response to detecting the occurrence of the trigger event;

determining an outcome of the second game;

identifying one of a plurality of separate jackpot prizes to be awarded to the player based on the outcome of the second game;

wherein the occurrence of the trigger event is based on a predefined turnover value and the amount of credits wagered on the first game, and the predefined turnover value is an expected turnover of the gaming machine between a first occurrence of the trigger event during play of the first game and a subsequent consecutive second occurrence of the trigger event during play of a subsequent first game.

7. The method as claimed in claim 6, wherein the play of the second game can only occur after the play of the first game has been completed.

8. The method as claimed in claim 6, comprising the steps of:

using a jackpot controller to maintain the plurality of separate jackpot prizes; and communicating with the jackpot controller via a communication network.

9. The method as claimed in claim 8, wherein the gaming machine is one of a plurality of gaming machines in which at least a first of the gaming machines has a denomination that is different to a denomination of at least a second of the gaming machines.

10. The method as claimed in claim 6, wherein the occurrence of the trigger event is based on:

selecting a number from a predetermined range of numbers, the predetermined range of numbers being based on the predefined turnover value; and selecting a set of numbers from the predetermined range of numbers, wherein the size of the selected set of numbers is based on the amount of credits wagered on the first game, wherein if the number selected from the predetermined range and the selected set of numbers meet a predefined criterion the game controller detects the occurrence of the trigger event.

11. A gaming machine arranged to facilitate a play of a first game in which a player can wager an amount of credits on an outcome of the first game, the gaming machine also being arranged to detect a trigger event that can occur as a result of the play of the first game, the trigger event is based on a predefined turnover value and the amount of credits, the predefined turnover value is based on at least a turnover of the gaming machine between a first occurrence of the trigger event and a subsequent consecutive second occurrence of the trigger event, the gaming machine being further arranged such that in response to detecting an occurrence of the trigger event a second game can be played, the second game being arranged to identify a prize to be awarded, the gaming machine being arranged to cooperate with a prize controller, which is remote to the gaming machine, via a data network to facilitate awarding of the prize.

12. The gaming machine as claimed in claim 11, wherein the second game is arranged such that it has a greater probability of awarding the prize relative to the first game.

13. The gaming machine as claimed in claim 11, wherein the prize comprises a jackpot prize.

14. The gaming machine as claimed in claim 11, wherein the second game comprises a plurality of outcomes, wherein at least one of the outcomes is used for awarding the prize.

15. The game machine as claimed in claim 11, wherein the gaming machine is arranged such that it enters a locked state, in which further play of the gaming machine is prevented, in response to the prize being awarded.

16. The gaming machine as claimed in claim 11, wherein the occurrence of the trigger event is based on: selecting a number from a predetermined range of numbers, the predetermined range of numbers being based on the predefined turnover value; and selecting a set of numbers from the predetermined range of numbers, wherein the size of the selected set of numbers is based on the amount of credits, wherein if the number selected from the predetermined range of numbers and the selected set of numbers meet a predefined criterion the gaming machine detects the occurrence of the trigger event.

17. A method for use with a gaming machine, the method comprising: facilitating a play of a first game on the gaming machine in which a player can wager an amount of credits on an outcome of the first game;

detecting a trigger event that can occur as a result of the play of the first game, the trigger event is based on a predefined turnover value and the amount of credits, the predefined turnover value is based on at least a turnover of the gaming machine between a first occurrence of the trigger event and a subsequent consecutive second occurrence of the trigger event; and in response to detecting an occurrence of the trigger event, facilitating a play of a second game, the second game being arranged to identify a prize to be awarded, the gaming machine being arranged to cooperate with a prize controller, which is remote to the gaming machine, via a data network to facilitate awarding of the prize.

18. The method as claimed in claim 17, wherein the second game is arranged such that it has a greater probability of awarding the prize relative to the first game.

19. The method as claimed in claim 17, wherein the prize comprises a jackpot prize.

20. The method as claimed in claim 17, wherein the second game comprises a plurality of outcomes, wherein at least one of the outcomes is used for awarding the prize.

21. The method as claimed in claim 17, wherein the gaming machine is arranged such that it enters a locked state, in which further play of the gaming machine is prevented, in response to the prize being awarded.

22. The method as claimed in claim 17, wherein the occurrence of the trigger event is based on: selecting a number from a predetermined range of numbers, the predetermined range of numbers being based on the predefined turnover value; and selecting a set of numbers from the predetermined range of numbers, wherein the size of the selected set of numbers is based on the amount of credits, wherein if the number selected from the predetermined range of numbers and the selected set of numbers meet a predefined criterion the gaming machine detects the occurrence of the trigger event.

* * * * *